Sept. 25, 1973   J. D. SMITH   3,761,386
NOVEL MEMBRANE SPACER
Filed Aug. 2, 1971   2 Sheets-Sheet 1

United States Patent Office 3,761,386
Patented Sept. 25, 1973

3,761,386
NOVEL MEMBRANE SPACER
Jack D. Smith, Boston, Mass. (% Process Research, Inc., 56 Rogers St., Cambridge, Mass. 02142)
Filed Aug. 2, 1971, Ser. No. 168,335
Int. Cl. B01d 13/02
U.S. Cl. 204—301                                              5 Claims

ABSTRACT OF THE DISCLOSURE

A novel spacer suitable for use in electrodialysis processes and novel electrodialysis apparatus utilizing the spacer. The spacer comprises a tortuous flow path having a turbulence-promoting grid therein wherein said flow path is formed in a sheet of material and wherein said grid extends beyond said flow path into said sheet, thereby reinforcing the sheet.

BACKGROUND OF THE INVENTION (A) Field of the invention

This invention relates to membrane-moderated electrodialysis processes and, more particularly, to a novel flow-directing means to be used between the respective membranes in electrodialysis apparatus.

(B) Prior art

Electrodialysis is a process which exploits the selective ion-exclusion properties of ion exchange membranes in such a manner as to effectively remove ions, or separate ions of differing charges, from solution by utilization of electrical energy. In an illustrative example, salt water comprising sodium cations and chlorine anions and contained in a middle compartment bounded on the left by a cation membrane, will be affected in such a way that the cation will be separated out through a cation-permeable (positive) membrane, but the anion will be separated out through an anion-permeable (negative) membrane. Thus, there will be a tendency to dilute the middle compartment, which originally contains the salt water, and to concentrate cations in the left compartment and anions in the right compartment.

The extent of salt removal from the compartment being subjected to dilution depends upon the amount of electrical current passed through the solution, the particular ions present in the solution, and the flow rate of the feed solution through the equipment.

In addition to the passage of sodium and chlorine ions through the membranes, there are also electrochemical reactions which take place at the cathode and anode. Hydrogen gas and hydroxide ions tend to be produced at the cathode (negative) electrode, oxygen or chlorine gas and hydrogen ions are produced at the anode (positive) electrode.

In general, it has been found that the rate of mass transfer in any electrodialysis process is limited by the rate of diffusion of ions to the membrane-solution interface at the surface of the membrane through which they are to be transported. Equipment designed for electrodialysis requires a consideration of the boundary film phenomena at this interface. Cost-effectiveness considerations for electrodialysis processing calls for an optimal design, i.e. a design which can operate at higher current densities than have been practially attainable. But the practical limit on this current density within any particular design parameter is the so-called polarization phenomena. As the current density is increased, the concentration of current-carrying ions at the membrane-solution interfaces (i.e., those interfaces within the compartment holding the water being deionized) becomes progressively diluted with respect to ions to be removed. A point is ultimately reached where any further increase in current can only be accomplished through the undesirable dissociation of available water molecules at these membrane-solution interfaces. When this happens, hydrogen ions carry current across cation-permeable membranes, and hydroxide ions carry current across anion-permeable membranes.

This current-carrying by hydrogen and hydroxide ions is undesirable for a number of reasons: First, a decrease in current efficiency occurs because the current carried by the hydrogen and hydroxide ions does not contribute to the desired demineralization. Secondly, there is an increase in electrical resistance in the system, this increase being assignable to the depletion of ion concentration, at the membrane-solution interfaces. Furthermore, there is a large rise in D.C. energy consumption because of the additional energy required or consumed by the two aforementioned phenomena and the additional energy required to dissociate water. Finally, the pH changes at the membrane surfaces which will often result in precipitation of any pH-sensitive components of the solution. Such precipitation will result in a mechanical fouling of the membrane surface.

The upper limit of a practical current density is controlled by Fickian diffusion of current-carrying ions across a boundary layer or "stagnation film" which exists at the membrane-solution interface. In conventional electrodialysis equipment, turbulence-promoting obstructions are placed in the flow paths between membranes to reduce the thickness of these boundary layers. This normally results in one being able to obtain higher maximum current densities at the cost of additional pressure drop across the liquid flow system.

The geometry of the flow path and use of spacers therein have tended to fall into two types of basic designs. First, there are spacers comprising a relatively high-velocity, turbulence-promoting, tortuous path design. Secondly, there is a low-velocity, so-called sheet flow, design. Neither of the above-described designs have been entirely adequate in overcoming the problem of obtaining adequately-turbulent flow and good process economy.

SUMMARY OF THE INVENTION

Therefore, it is a principal object of the instant invention to provide dialysis apparatus which incorporates an improved spacer therein and is operable at higher current densities and, consequently, at higher operating efficiencies and having much lower capital cost.

It is a further object of the invention to provide an improved spacer which alleviates the so-called concentration depletion problem, but does so without contributing so much turbulence to the flow path between membranes that interferes with the efficient hydraulic operation of the electrodialysis apparatus.

Another object of the invention is to provide a spacer of such improved construction that it can be formed into very thin elements of good strength.

Still another object is to provide an improved electrodialysis process utilizing relatively high ratios of current density to dilute solution concentration.

Other objects of the invention will be obvious to those skilled in the art in reading the instant application.

The above objects have been substantially accomplished as a consequence of the discovery that when a tortuous flow path is combined with particular turbulent-producing means to form a single separator, that separator has an extraordinary efficiency both with respect to its avoiding depletion of the ions from the membrane-solution interface and with respect to the hydraulic characteristics of the flow path through the separator. It has been found to be particularly useful in processing wherein the ratio of current density (defined in milliamps per cm.²) to dilute stream solution concentration (defined as equivalents per liter) is over about 800.

The invention accordingly comprises the several steps and the relation of one or more of such steps with respect to each of the others thereof, which will be exemplified in the process hereinafter disclosed, and the scope of the invention will be indicated in the claims.

ILLUSTRATIVE EXAMPLES OF THE INVENTION

For a fuller understanding of the nature and objects of the invention, reference should be had to the following detailed description taken in connection with the accompanying drawings, in which.

Figure 1A:
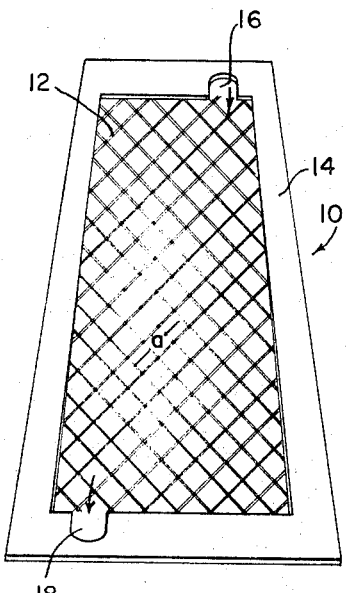
FIG. 1A is a "sheet flow" type of spacer known to the prior art, the use of which is illustrated below.

Referring to the drawings, it is seen that the typical sheet flow spacer 10 of FIG. 1A incorporates a reticulated turbulence promoting net 12 in a fluid-restraining sealing frame 14. Frame 14 is notched adjacent opposite corners thereof to provide an inlet port 16 and outlet port 18. The grid-shaped net 12 provides some turbulence to liquid traversing the flow path defined by membranes (not shown) on either side of spacer 10 and sealed in frame 14 to form a compartment to hold the water being deionized. Spacers of this general type have been found to tolerate relatively low current densities before excessive ionization of water occurs as the interface between the solution to be treated and the ion-permeable membrane.

Figure 1B:
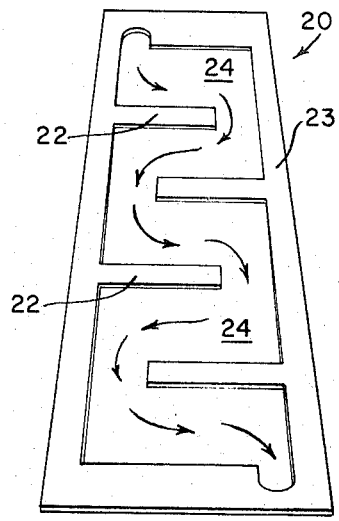
FIG. 1B is a "tortuous path" type of spacer known to the prior art, the use of which is illustrated below.

FIG. 1B shows a so-called tortuous flow spacer 20 with a plurality of bar-like flow obstructions 22 projecting into the flow path from sealing frame 23, thereby forming substantially parallel channel segments connected serially to one another to provide a tortuous flow path 24. Spacers of this general type require considerably higher flow velocities to achieve moderate improvements in ability to tolerate higher current densities.

Figure 1C:
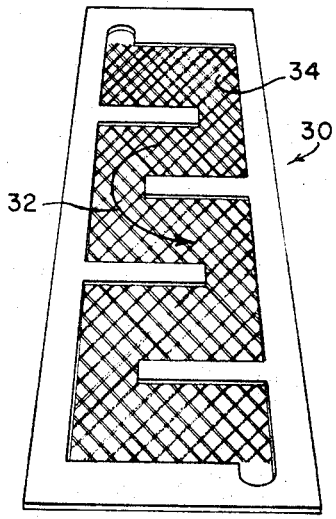
FIG. 1C is a spacer constructed according to the instant invention, but related in dimension to the spacers shown in FIGS. A and B to more clearly illustrate its advantages thereover.

FIG. 1C illustrates a separator 30 according to the invention: tortuous path 32 is furnished with a turbulence-producing grid 34. As will be evident from the data presented below such a membrane results in a flow surprisingly high toleration for current density based on membrane area. This increase in current density allows major savings in capital equipment by reducing the amount of membrane areas required to, typically, about half of that area required with the best of the previously-described spacers.

Figure 2:
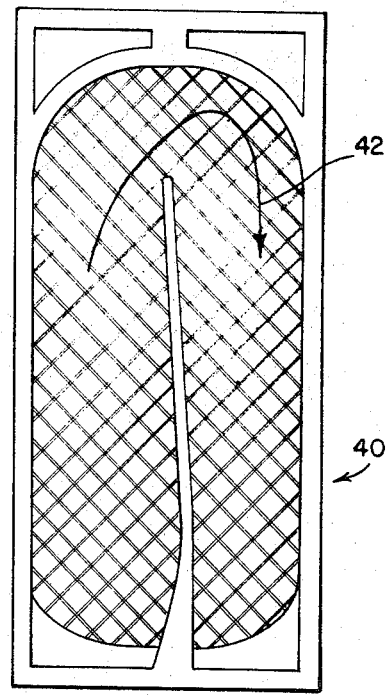
FIG. 2 is a plan view of another spacer constructed according to the instant invention.

The spacer 40 of FIG 2 is also constructed according to the invention wherein the width of the flow path 42 is decreased along the length of the flow path to achieve or maintain velocity of fluid at the outlet of the flow path.

Figure 3A:
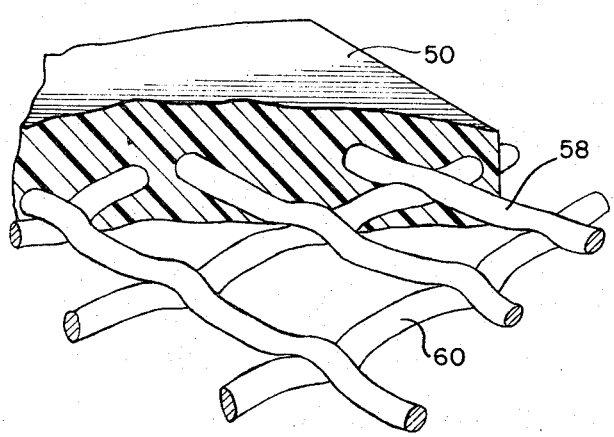
FIG. 3A is a perspective and enlarged view of the reinforcing and turbulence-promoting member forming an internal part of the spacer of FIG. 3.
Figure 3:
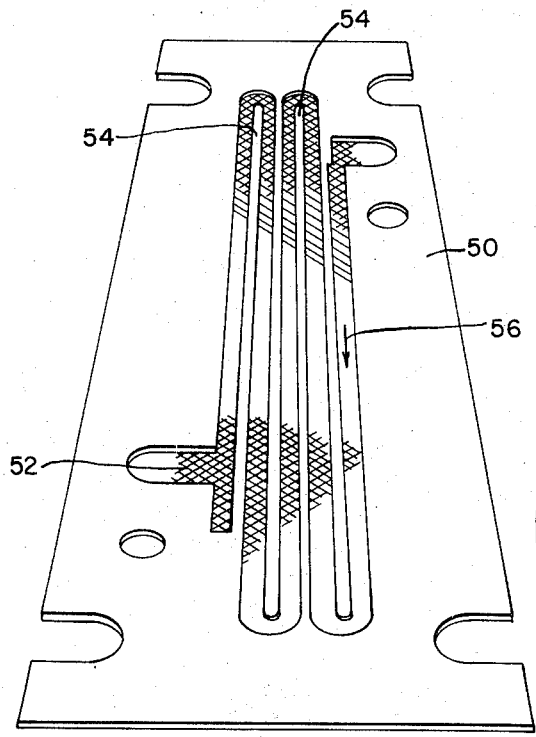
FIG. 3 is a view of still another spacer constructed according to the invention.
Figure 3B:
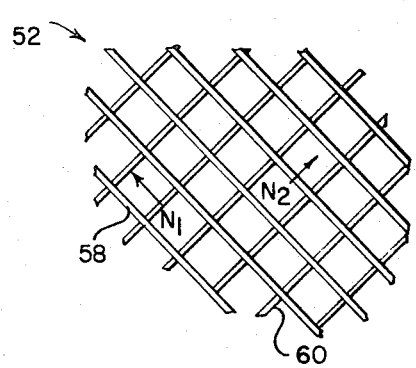
FIG. 3B is a schematic diagram showing the liquid flow pattern over the turbulence promoting member shown in FIG. 3A.

A particularly advantageous construction of a spacer according to the invention is shown in FIG. 3. Frame 50 forms a matrix around grid-like net structure 52 and is mechanically reinforced thereby. Spacer bars 54 provide a relatively long, narrow flow path 56. In FIGS. 3A and 3B, an enlarged view of net structure 52 shows that it consists of an upper strand 58 and lower strands 60 rather than by a woven net structure. Strands 58 and 60 are arranged at about right angles to one another. Flow paths are formed between (a) each pair of the lower strands 60 and (b) each pair of the upper strands 58. These flow paths are interconnected and, when they are arranged so that the grid is oriented substantially away from the right agular relationship to the flow, promote an extremely advantageous flow pattern.

A particular advantage of the grid-like net 52 turbulence promoter shown in FIGS. 3, 3A and 3B is that the orientation of the linear component thereof provides two flo-vectors $N_1$ and $N_2$ at about at 90° angle from each other. Thus, the actual direction of each of the two flow components of liquid is about 45° removed from the overall flow of liquid.

Figure 4:
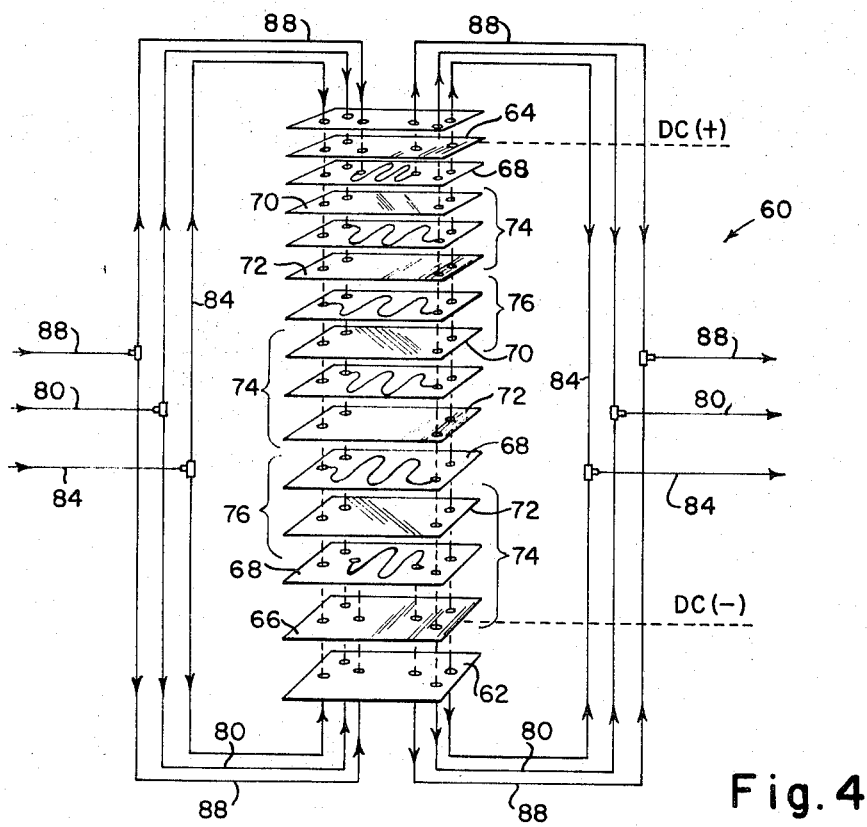
FIG. 4 is a schematic diagram of an electrodialysis stack utilizing the spacers of the invention.

FIG. 4 is an exploded schematic diagram of a typical electrodialysis apparatus 60 of the type with which the spacers of the invention can be utilized. The elements shown in FIG. 4 are normally fastened together to form a stack sealed around the perimeter of each element and comprising an endplate 62 at each end of the stack, a source of direct current connected across a positively-charged plate (anode) 64 adjacent one end of the stack and a negatively-charged plate (cathode) 66 at the opposite end of the stack. Between the anode plate 64 and cathode plate 66 are mounted membranes 70 which are slectively permeable to anions and membranes 72 which are selectively permeable to cations. Spacers 68 are mounted between the anode 64 and adjacent anion-permeable membrane 70, between the cathode 66 and adjacent anion-permeable membrane, and between each adjacent cation-permeable membrane 72 and anion-permeable membrane 70. When compressed into stack relationship by insertion of clamping-bolt means not shown in FIG. 4, a plurality of cells are formed between the membranes. However, alternating cells provide alternating functions. For example cells 74 are diluting cells, i.e., cells from which ions permeate through the membrane walls to leave the feed solution and escape into a concentrating cell 76 from which the ions are then transported from the apparatus to waste or, when appropriate, to an ion recovery process.

Feed solution is carried in through conduits 80 to a diluting cell 74 wherein it is carried while in contact with a pair of membranes 70 and 72 on either side of cell 74 and ejected through the outlet loop of conduit system 80, depleted in ion content because of the anions which permeated a membrane 70 and cations which permeated a membrane 72.

In the embodiment shown in FIG. 4, brine is being concentrated in concentrating cells 76. Thus brine is recycled through conduit system 84 which includes concentrating cells 76. At each pass through a cell 76, the brine is the recipient of additional anions and cations.

An acid solution is continually recycled through the spacers 68 adjacent to the cathode and anode and through conduit system 88.

It will thus be seen that the objects set forth above, including those made apparent from the preceding description, are efficiently attained and, since certain changes may be made in the above articles without departing from the scope of the invention. It is intended that all matter contained in the above description or shown in the accompanying drawings and working examples below will be interpreted as illustrative and not in a limiting sense.

It is particularly surprising that such a high current density can be achieved without excessive ionization of water along the liquid-membrane interface where the solution being deionized contacts the membrane surface.

WORKING EXAMPLE 1

In the following example, a spacer constructed according to the invention is compared to prior art spacers of (a) the sheet flow type and of (b) the tortuous path type. The spacers are identified as follows:

Spacer A—sheet flow type spacer
Spacer B—tortuous path type spacer
Spacer C—spacer of the instant invention
Spacer D—spacer like spacer C but a thinner spacer and with a wider flow path.

The electrodialysis process which was accomplished using each of the above identified spacers was this:

one thousand gallons per day of water at 25° C., is to be dialysed to reduce the salt (NaCl) concentration thereof from 2000 parts per million (0.034 molar) to 500 parts per million (0.0085 molar). The electrodialysis membranes utilized are those such as commonly used having transport members of about 0.98 and having a resistance of 15 ohms per square centimeter.

EXAMPLE 1A

A typical sheet flow spacer of the type shown in FIG. 1A has the following dimensions:

|  | Cm. |
|---|---|
| Length of flow path (L) | 100 |
| Obstruction spacing ($l$) | 0.2 |
| Width of flow path ($a$) | 20 |
| Thickness ($t_d$) | 0.1 |

This spacer is utilized with three electrodialysis stacks of the type commonly available and containing about 250 cell pairs with about 6000 square cm. of effective membrane transfer area per cell pair. The membranes are supported on the downstream sides thereof with support grids having a 0.2 mesh spacing.

It is found that the practical limit of current density for the application being described is about 7 amps per square foot of available membrane surface area. Thus under these conditions, it is necessary to utilize 18,000 cm.$^2$, i.e., to use three electrodialysis stacks in series to achieve the desired desalination at a rate of 1000 gallons per day. The D.C. power consumed per cell-pair is 90 watts. Flow velocity under these conditions is only 4.2 centimeters per second.

EXAMPLE 1B

A typical "tortuous flow-path" spacer of the type shown in FIG. 1B has the following dimensions:

$L=5s$
$s=7.5$ centimeters
$a=1.0$
$t_d=0.1$

This spacer is used in the same electrodialysis stacks as used in Example 1A and containing about 250 cell pairs with about 5000 square centimeters of effective membrane transfer surface per cell pair.

It is found that the practical limit of current density which can be utilized with this tortuous path spacer of Example 1A. Under such conditions it is necessary to utilize only 9300 square centimeters of, or about 3 of the membrane stacks in series, to achieve the desired desalination at a rate of 1000 gallons per day. The D.C. power consumed is 170 watts per cell pair. Flow velocity under these conditions is 60 centimeters per second.

EXAMPLE 1C

A spacer of the type shown in FIG. 1C, utilizing both the tortuous path and sheet flow designs is constructed with the following dimensions:

$L=5s$
$s=10$ centimeters
$a=1.0$
$t_d=0.1$
mesh$=0.2$

Thus, a reasonable attempt was made to incorporate the mesh of spacer 1A into the frame of the type used in spacer 1B to form a kind of "hybrid" spacer.

As in Examples 1A and 1B, this spacer is utilized in conjunction with an electrodialysis stack of the general type used in Examples 1A and 1B. This stack also contains about 250 cell pairs with about 3000 square centimeters of effective membrane transfer area, although, as it will appear below, only about the equivalent of one and one-half stacks will be required to accomplish the required desalination.

It is found that the practical limit of current density for the application being disclosed is about 28 amps per square foot of available surface area. This is achieved with a flow velocity of 45 centimeters per second. Under these conditions, it is necessary to utilize only 4300 square centimeters, i.e., to use only about 1.5 electrodialysis stacks in series to achieve the desired desalination at a rate of 1000 gallons per day.

The D.C. power consumed per cell-pair in 370 watts.

EXAMPLE 1D

A spacer of the same type as used in Example 1C was constructed with the following modified dimensions:

$L=5s$
$s=26$ cm.
$a=1.0$
$t_d=0.005$
mesh$=0.1$

Without any increase in the membrane area required to achieve the desired desalination, it is possible to drop the D.C. power requirement from the 370 watts of Example 1C to 240 watts while maintaining the current density at 28 maps per square foot.

What is claimed is:

1. In an electrodialysis apparatus of the type wherein a solution to be deionized is conveyed between a cation-permeable membrane and an anion-permeable membrane separated from one another by a channel-forming spacer, the improvement wherein said spacer comprises
    (A) a fluid-restraining seal frame forming seal means to bear against said membranes;
    (B) a sinuous flow channel substantially free of constriction defined by said seal frame which is composed of substantially parallel channel segments, connected for serial fluid flow therethrough; and a
    (C) turbulence-inducing flow obstacle distributed throughout said channels and extending also throughout said frame forming means to structurally reinforce said frame.

2. Apparatus as defined in claim 1 wherein said turbulence-inducing flow obstacles is a reticulated net which extends into and reinforces said seal plate and is formed of a non-woven structure consisting of upper strands laid at an angle over lower strands.

3. A membrane separator useful in electrodialysis apparatus comprising
    (A) a fluid-restraining seal frame;
    (B) a flow sinuous channel substantially free of constriction, defined by seal frame which is composed of substantially parallel channel segments connected for serial fluid flow from one segment to another; and
    (C) a turbulence-inducing flow obstacle extending throughout said channel and throughout said fluid-restraining frame to structurally reinforce said frame.

4. A membrane separator as defined in claim 3 wherein said turbulence-inducing means is a reticulated net.

5. A membrane separator as defined in claim 3 wherein said turbulence-inducing flow obstacle is a non-woven grid formed of lower strands and upper strands, said lower strands and upper strands so arranged at about a 90° angle from each other thereby forming means to cause turbulence by directing flow along vectors substantially away from a right angular relationship to the primary direction of flow along the turbulence-inducing obstacle.

References Cited

UNITED STATES PATENTS

| | | | |
|---|---|---|---|
| 2,735,812 | 2/1956 | Van Hoek | 204—301 |
| 2,784,158 | 3/1957 | Bodamer et al. | 204—301 |
| 2,948,668 | 8/1960 | De Whalley et al. | 204—301 |
| 3,073,774 | 1/1963 | Roberts et al. | 204—301 |
| 3,284,335 | 11/1966 | Tsunoda et al. | 204—301 |
| 3,318,795 | 5/1967 | Mintz et al. | 204—301 |
| 3,421,996 | 1/1969 | Coval et al. | 204—301 X |

JOHN H. MACK, Primary Examiner

A. C. PRESCOTT, Assistant Examiner

U.S. Cl. X.R.

204—180 P

UNITED STATES PATENT OFFICE
CERTIFICATE OF CORRECTION

Patent No. 3,761,386        Dated September 25, 1973

Inventor(s) Jack D. Smith

It is certified that error appears in the above-identified patent and that said Letters Patent are hereby corrected as shown below:

Column 5, line 20, "transport members" should read -- transport numbers --.

Column 6, line 30, "$t_d = 0.005$" should read -- $t_d = 0.05$ --

Signed and sealed this 26th day of March 1974.

(SEAL)
Attest:

EDWARD M. FLETCHER, JR.        C. MARSHALL DANN
Attesting Officer             Commissioner of Patents